US006639495B2

(12) United States Patent
Cage

(10) Patent No.: US 6,639,495 B2
(45) Date of Patent: Oct. 28, 2003

(54) ELECTROMAGNETIC ACTUATOR FOR INTRINSICALLY SAFE DEVICES

(75) Inventor: Donald R. Cage, Longmont, CO (US)

(73) Assignee: FMC Technologies, Inc., Chicago, IL (US)

( * ) Notice: Subject to any disclaimer, the term of this patent is extended or adjusted under 35 U.S.C. 154(b) by 257 days.

(21) Appl. No.: 09/804,356

(22) Filed: Mar. 12, 2001

(65) Prior Publication Data

US 2002/0125974 A1 Sep. 12, 2002

(51) Int. Cl.$^7$ ................................................. H01F 7/00
(52) U.S. Cl. ........................................ 335/229; 335/220
(58) Field of Search .......................... 335/222; 381/420, 381/421, 422

(56) References Cited

U.S. PATENT DOCUMENTS

| | | |
|---|---|---|
| 2,703,391 A | 3/1955 | Gunderson |
| 2,813,256 A | 11/1957 | Duinker et al. |
| 2,997,584 A | 8/1961 | Querfurth |
| 3,467,925 A | 9/1969 | Masuda |
| 3,723,780 A | 3/1973 | Gillum |
| 3,743,870 A | 7/1973 | Hunt |
| 3,805,099 A | 4/1974 | Kelly |
| 4,399,483 A | 8/1983 | Phelan |
| 4,630,013 A | 12/1986 | Takada |
| 4,698,608 A | 10/1987 | Kimble |
| 4,812,795 A | 3/1989 | Zabar |
| 5,155,399 A | 10/1992 | Zimmermann |
| 5,426,409 A | 6/1995 | Johnson |
| 5,786,741 A | 7/1998 | Leibzon |
| 6,091,167 A | 7/2000 | Vu et al. |
| 6,192,744 B1 | 2/2001 | Henderson |

FOREIGN PATENT DOCUMENTS

| | | | | |
|---|---|---|---|---|
| JP | 59165405 A | * | 9/1984 | ............. H01F/7/16 |
| JP | 63247923 A | * | 10/1988 | ............. G11B/7/09 |
| JP | 2000209834 A | * | 7/2000 | ............. H02K/33/18 |

* cited by examiner

Primary Examiner—Elvin Enad
Assistant Examiner—Bernard Rojas
(74) Attorney, Agent, or Firm—Henry C. Query, Jr.

(57) ABSTRACT

The present invention is directed to an electromagnetic actuator for a device having a first component which is movable relative to a second component, the electromagnetic actuator comprising a coil which is coupled to the first component; a magnetically permeable core which is coupled to the second component and which comprises an annular pole having first and second ends, a cylindrical keeper positioned around the pole, and a base connecting the first end of the pole to an adjacent end of the keeper; wherein the inner diameter of the keeper is greater than the outer diameter of the pole and the coil is positioned between the keeper and the pole; a magnet which is magnetically coupled to the core and which produces a magnetic field having flux lines that flow through the keeper, the base and the pole and across the coil; wherein the pole comprises an inner annular surface which is tapered from the first end to the second end to reduce the inductance of the coil and thereby permit the actuator to generate a greater force while remaining within the inductance and current limits pertaining to intrinsically safe devices.

27 Claims, 4 Drawing Sheets

ELECTROMAGNETIC ACTUATOR FOR INTRINSICALLY SAFE DEVICES

BACKGROUND OF THE INVENTION

The present invention relates to an electromagnetic actuator having at least one magnet and coil pair for generating a desired actuation force in a device. More particularly, the invention relates to such an actuator which comprises a core having central pole which is specifically designed to reduce the inductance of the coil and thereby permit the actuator to generate a greater force while remaining within the inductance and current limits pertaining to intrinsically safe devices.

In the field of industrial process control, devices such as flowmeters, densitometers, valve positioners and the like often include an electromagnetic actuator for generating a desired force which is required to operate the device. The electromagnetic actuator typically comprises at least one coil which is paired with a magnet that is mounted in a core which serves to direct the flux lines of the magnetic field produced by the magnet across the coil. Thus, when the coil is energized, the current in the coil will interact with the magnetic field to generate a force that acts between the coil and the magnet. For example, vibrating tube-type mass flowmeters and densitometers typically employ one or more magnet and coil pairs to generate vibratory excitation forces on the tube through which the material to be measured or processed is passed.

The force which is generated by the magnet and coil pair is proportional to both the current in the coil and the flux density of the magnetic field existing in the air gap in which the coil is located. Furthermore, although the flux density can be increased, prior art electromagnetic actuators are typically designed to have a flux density in the core of no more than about 50% of the saturation flux density of the core material. This is due to the fact that, heretofore, increasing the flux density usually required using a larger magnet or one which is constructed of a more expensive material, and this would unduly increase the weight or cost of the actuator. Thus, devices which require large actuating forces usually must be powered by high operating currents.

Since many industrial applications require that these devices operate in hazardous environments in which flammable or explosive gases or dust may be present, certain approval agencies such as UL, CSA, BVS and the like have developed safety regulations governing the design of these devices in order to minimize the risk of explosion. One method by which a device can be qualified to operate in hazardous environments is to design the electromagnetic actuator to meet the regulations applicable to "intrinsically safe" ("IS") devices. The IS regulations require that the amount of stored energy in the electromagnetic actuator, which is proportional to both the inductance of the coil and the square of the current in the coil, be minimized by limiting the current and inductance levels so that a failed component or broken or shorted wire will not cause a spark which could trigger an explosion. The various approval agencies publish design guidelines delimiting the maximum acceptable current levels for given inductance values for IS devices. However, certain industrial devices which require large electromagnetic actuating forces necessitate the use of currents which are normally greater than the maximum acceptable current levels. Consequently, such devices normally cannot be qualified for use in hazardous environments as IS devices.

SUMMARY OF THE INVENTION

According to the present invention, these and other disadvantages in the prior art are overcome by providing an electromagnetic actuator for an IS device having a first component which is movable relative to a second component. The electromagnetic actuator comprises a coil which is coupled to the first component, a magnetically permeable core which is coupled to the second component, a magnet which is positioned in association with the coil and which is magnetically coupled to the core, and a power supply for selectively energizing the coil. The core preferably includes a cylindrical keeper which comprises first and second ends, an annular pole which is positioned concentrically within the keeper and which comprises first and second ends, and a base which connects the first end of the keeper to the first end of the pole. The inner diameter of the keeper is greater than the outer diameter of the pole, and the coil is positioned between the keeper and the pole. In one embodiment of the invention, the magnet comprises a cylindrical body having an outer diameter which is affixed to the keeper and an inner diameter which is greater than the outer diameter of the pole to thereby define a gap between the pole and the magnet in which the coil is positioned. Moreover, in accordance with the present invention the shape of the pole is designed to increase the flux density in the pole and thereby reduce the permeability of the pole, which consequently will reduce the inductance of the coil.

According to a preferred embodiment of the invention, the pole comprises an inner surface which is tapered from the first end to the second end to achieve a flux density in the pole which is greater than 50%, and preferably between about 75% to 95%, of the saturation flux density of the pole. It has been found that the permeability of the pole at this level of flux density is sufficiently reduced to allow a meaningful decrease in the inductance of the coil while still permitting the electromagnetic actuator to operate at an acceptable efficiency level. Thus, a higher current can be employed in the coil while still maintaining the total stored energy in the electromagnetic actuator within required limitations. Therefore, the electromagnetic actuator is capable of generating a greater actuating force than was previously possible while allowing the device to operate within the current and inductance limitations prescribed by the IS regulations.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
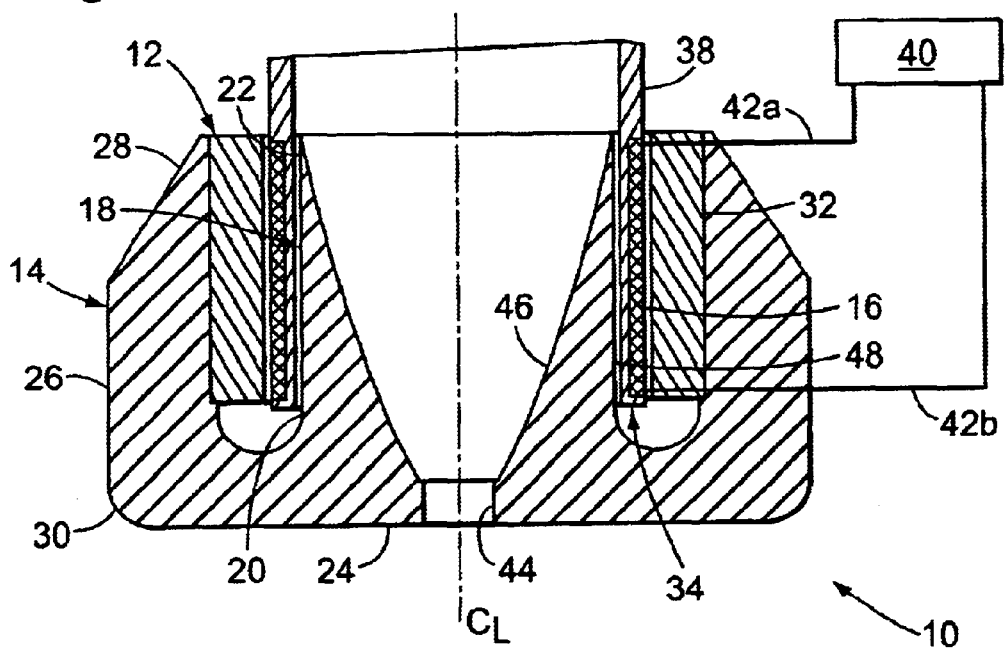
FIG. 1 is a longitudinal cross-sectional view of an electromagnetic actuator which is constructed in accordance with the present invention.

Referring to FIG. 1, a preferred embodiment of an electromagnetic actuator 10 is shown to comprise a magnet 12 for generating a magnetic field which is directed through a core 14 and across a coil 16. The core 14 includes an annular central pole 18, which comprises a lower first end 20 and an upper second end 22, a base 24 which is attached to the first end 20, and an outer, preferably cylindrical keeper 26 which is attached to the base 24 outboard of the pole 18. The keeper preferably comprises a sloped upper edge 28 and a rounded bottom edge 30 to facilitate the flow of magnetic flux through the core 14. Furthermore, the core 14 is optimally comprised of an integral member which is machined from a suitable magnetically permeable material, such as steel.

Figure 2:
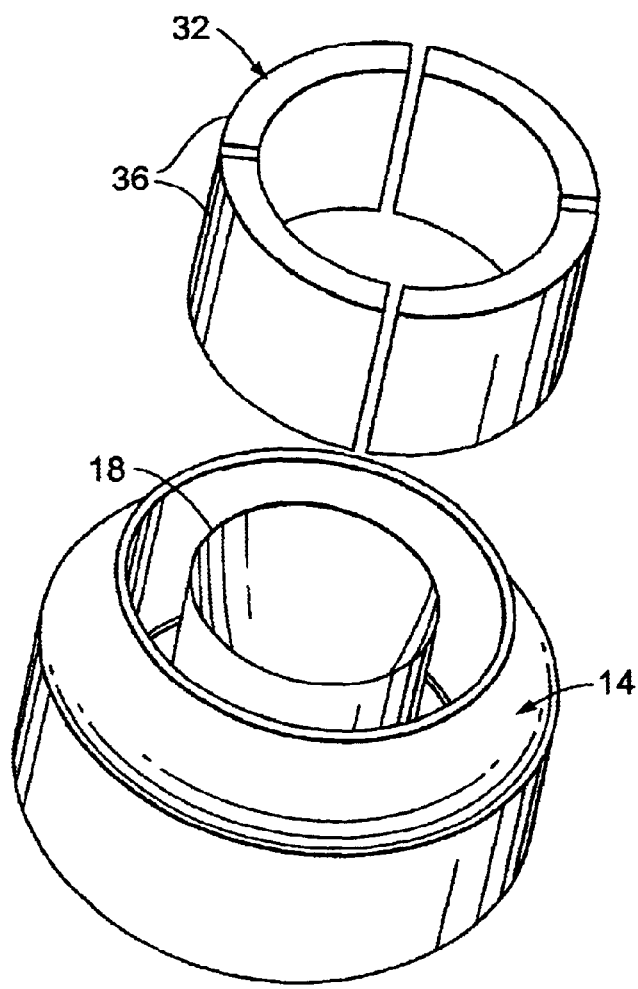
FIG. 2 is an exploded perspective view of the magnet and core components of the actuator depicted in FIG. 1.
Figure 3:
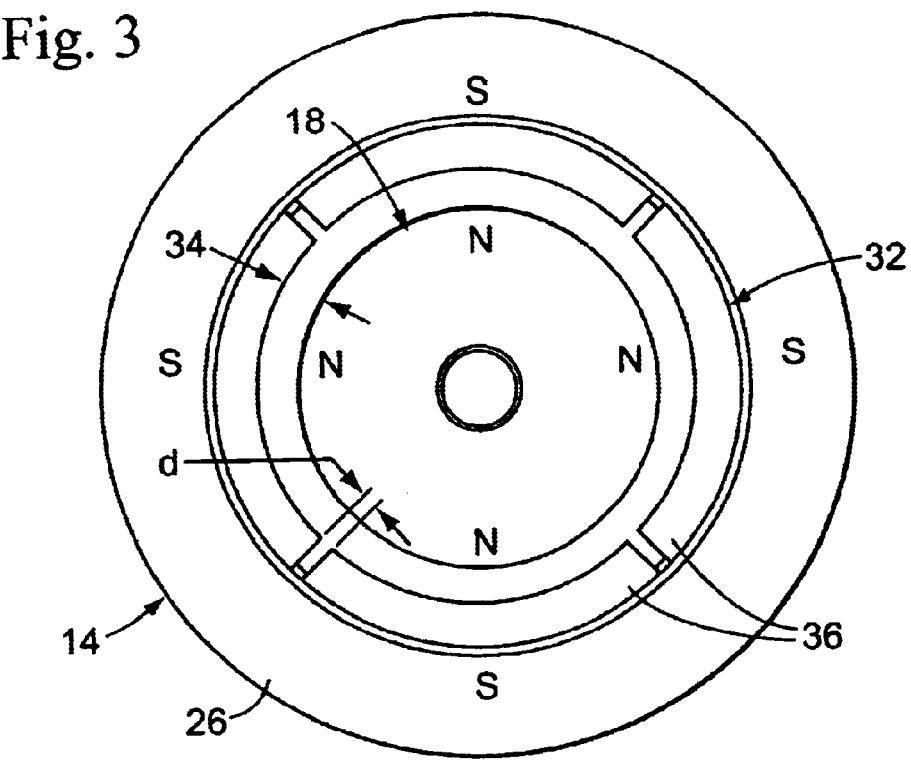
FIG. 3 is a top plan view of the magnet and core components of the actuator depicted in FIG. 1.

The magnet 12 is preferably a permanent magnet which is positioned in association with the coil 16 and is magnetically coupled to the core 14. In the embodiment of the invention shown in FIG. 1, the magnet 12 comprises a cylindrical body 32 which is disposed around the pole 18 and is attached, such as with a suitable adhesive, to the keeper 26. In addition, the inner diameter of the magnet 12 is selected to be larger than the outer diameter of the pole 18 so that an annular gap 34 is formed between the magnet and the pole. Also, as shown in FIGS. 2 and 3 the magnet 32 preferably comprises a number of arc segments 36, such as four 90° segments or six 60° segments, which are separated by a space "d". For example, with the arc segments 36 disposed in a cylinder having an inside diameter of about 2.25 inches, the distance d may be approximately 0.10 inch. The arc segments 36 are simpler to manufacture than a one-piece cylinder, and the space d limits the radial flow of eddy currents between adjacent arc segments. The magnet 12 is ideally constructed of a rare earth material, such as samarium cobalt, and as shown in FIG. 3 each arc segment 36 is radially charged so that its north pole is located on the inner diameter of the segment and its south pole is located on the outer diameter of the segment. As such, the flux lines of the magnetic field $H_{DC}$ produced by the magnet 12 will generally flow from the outer diameter of the magnet, down through the keeper 26, across the base 24, up through the pole 18, and across the gap 34 to the inner diameter of the magnet.

Although not illustrated in the drawings, it should be understood that the magnet 12 could have a configuration other than as described above. For example, the magnet could have a cylindrical body which is mounted on the pole 18 rather than the keeper 26. Alternatively, the magnet could comprise a solid, axially charged cylindrical body positioned at the first end 20 of the pole 18. Also, the magnet may comprise a coil which is energized by a DC current from a suitable power supply.

Referring again to FIG. 1, the coil 16 is wound on a portion of a tubular bobbin 38 which is positioned in the gap 34 between the magnet 12 and the pole 18. The bobbin 38 is ideally constructed of a magnetically-indifferent material, such as plastic or ceramic. The coil 16 is connected to a suitable power supply 40 by appropriate leads 42a and 42b. When installed in a device such as a flowmeter, a densitometer, a valve positioner or the like, the bobbin 38 and the core 14 are connected to respective first and second components of the device (not shown). The core 14 may include a preferably axial hole 44 in the base 24 to facilitate connecting the core to the second component.

In operation of the electromagnetic actuator 10, selective activation of the power supply 40 will generate a current I in the coil 16 which is generally perpendicular to the flux lines of the magnetic field $H_{DC}$ in the gap 34. The interaction of the field $H_{DC}$ and the current I will produce an actuating force between the coil 16 and the core 14 which is substantially parallel to the centerline CL of the coil. In a preferred embodiment of the invention, the current supplied by the power supply 40 is an AC current. Thus, the actuating force will likewise alternate directions. As is known in the art, the actuating force is proportional to the product of the current I and the flux density B of the magnetic field $H_{DC}$ in the gap 34. Thus for a given core, the larger the current I in the coil 16, the greater will be the actuating force acting between the core and the coil.

Figure 5:
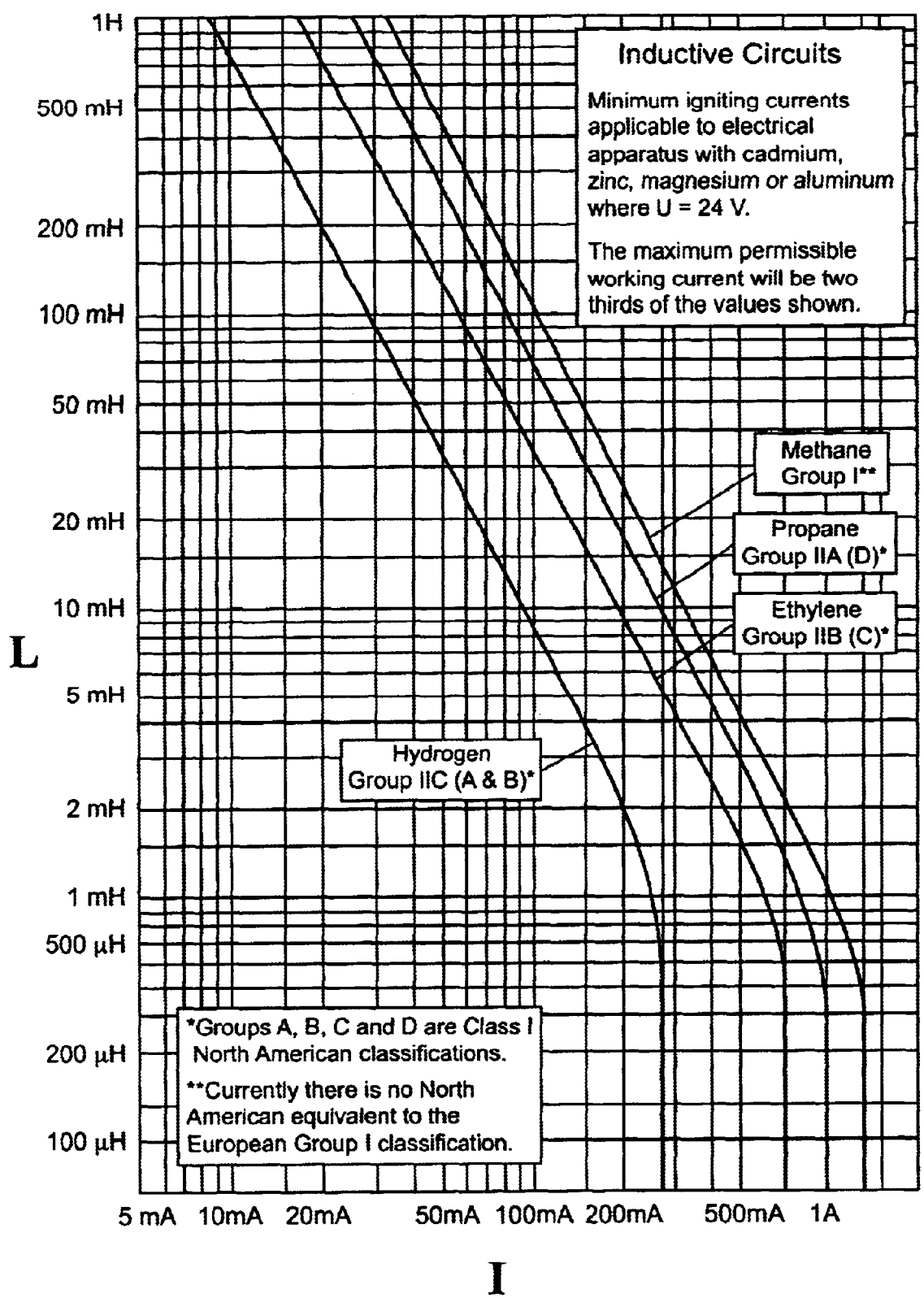
FIG. 5 is a plot of certain exemplary minimum ignition curves for inductive circuits which delimit the maximum inductance and current levels allowable for IS devices.

However, the regulations governing IS devices limit the amount of stored energy that may exist in the electromagnetic actuator 10. The stored energy in the coil 16 may be determined from the following equation:

$$E = \tfrac{1}{2} L I^2, \qquad [1]$$

Where L is the inductance of the coil. Thus, in order to satisfy the IS regulations, the current and the inductance of the coil 16 must both remain within certain acceptable limits. As shown in FIG. 5, these limits depend on the particular hazardous substance with which the IS device is intended to be used. For example, if the electromagnetic actuator 10 is intended to be used in a Coriolis mass flowmeter that will be used in the presence of hydrogen, and if the inductance of the coil 16 is 10 mH, then the maximum current that may be used to power the actuator while still adhering to IS regulations is approximately 60 mA (i.e., ⅔ of 90 mA). For certain devices which require large actuation forces, this current may not be sufficient.

According to the present invention, the electromagnetic actuator 10 permits the use of a larger current, which results in a greater actuating force, by minimizing the inductance of the coil 16. The inductance of the coil is reduced by specifically designing the shape of the pole 18 such that the flux density B in the pole is increased to a desired level. The increase in the flux density B will in turn reduce the permeability of the pole and consequently reduce the inductance of the coil 16. In this manner, the electromagnetic actuator 10 will be capable of generating greater actuating forces while maintaining the current and inductance levels of the coil 16 within the acceptable ranges established by the IS regulations.

Figure 6:
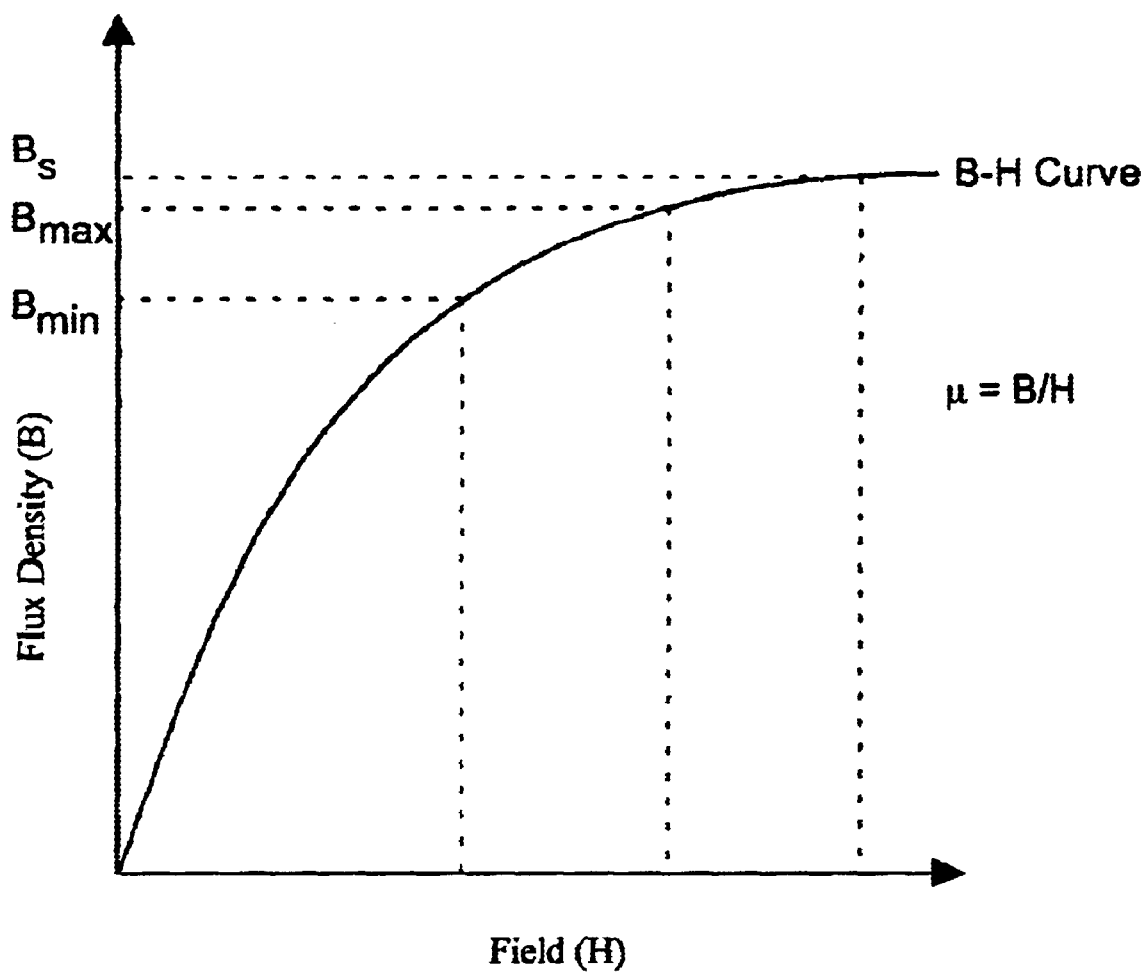
FIG. 6 is a graph of an exemplary B-H curve for a magnetically permeable material such as iron or steel.

The effect of the flux density B on the permeability of the pole 18 can best be explained with reference to FIG. 6. For purposes of this explanation, one can assume that the B-H curve depicted in FIG. 5 is similar to that for the material of the core 14. As is known in the art, the permeability $\mu$ of a material is equivalent to the slope of the B-H curve at a given point. As the magnitude of the flux density B approaches zero, the slope of the B-H curve, and thus the permeability $\mu$, is at a maximum value. As the magnitude of flux density B increases, the slope of the B-H curve, and thus the permeability $\mu$, decreases. Moreover, when the core is saturated, that is, when the flux density is equal to the saturation flux density $B_S$, the permeability reaches a minimum value. Thus, by increasing the flux density B in the pole 18, the permeability $\mu$ of the pole is decreased.

This reduced permeability $\mu$ of the pale 18 effects a decrease in the inductance L of the coil 16. The inductance L of the coil in Henrys can be approximated from the following generalized equation:

$$L = (N^2 \mu A)/l, \qquad [2]$$

where N is the number of turns in the coil, A is the area of the coil in square meters, and l is the length of the coil in meters. Thus, when the permeability $\mu$ of the core 14 is reduced, the inductance of the coil 16 is reduced. Therefore, increasing the flux density B in the pole 18 decreases the inductance L of the coil 16.

Since an increase in the flux density B in the pole 18 reduces the inductance L of the coil 16, the current I in the coil can be increased without exceeding the maximum stored energy limit of the coil. This is apparent both from equation 1 above and from FIG. 5. Consequently, the electromagnetic actuator 10 is capable of generating a larger actuating force while still adhering to the IS regulations.

According to a preferred embodiment of the present invention, the flux density B in the pole 18 is increased to a desired level through the specific design of the pole. As is known in the art, the magnitude of the flux density B in the pole 18 is dependent on the shape of the pole and the strength of the magnetic field $H_{DC}$ produced by the magnet 12. Thus, by designing the pole 18 to have a particular shape, a desired level of flux density B in the pole can be obtained for a given magnet 12.

Accordingly, referring again to FIG. 1, the pole 18 is ideally designed to comprise an inner surface 46 which is tapered from the first end 20 to the second end 22. The optimal shape of the inner surface 46 was achieved through successive modifications of a cubic spline using an iterative finite element analysis procedure. The results of each step of the procedure were analyzed, and the spline was further modified to achieve a magnitude of flux density B approaching the desired level and a more uniform distribution of the flux density B between the first and second ends 20, 22.

Figure 4:
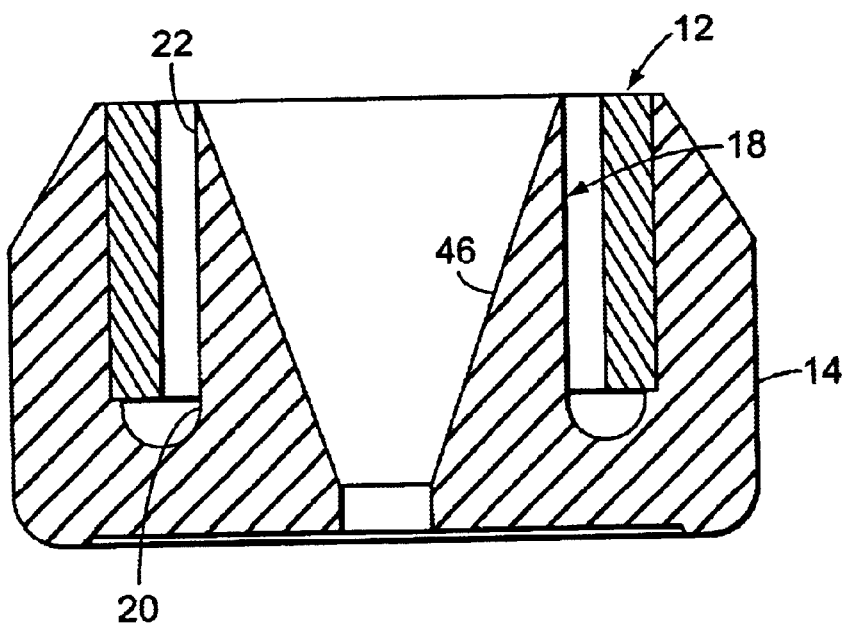
FIG. 4 is a longitudinal cross-sectional view of the magnet and core components of another embodiment of an electromagnetic actuator which is constructed in accordance with the present invention.

As shown in FIG. 1, the resulting inner surface 46 is a tapered surface. Preferably, the inner surface 46 is a non-linear tapered surface. More preferably, the inner surface 46 is a non-linear tapered surface of the third order. In addition to achieving the desired magnitude of flux density B in the pole 18, the surface 46 also limits the radial cross sectional area of the pole so that the magnitude of the flux density B is approximately the same between the first and second ends 20, 22. While this flux density distribution is achieved in the preferred embodiment of the invention with a non-linear tapered surface 46, it should be understood that any desired flux density distribution may be achieved by suitably shaping the inner surface 46. For example, as shown in the embodiment of the invention depicted in FIG. 4, a pole 18 having a substantially linear tapered inner surface 46 may achieve a desired distribution of flux density between the first and second ends 20, 22 for certain applications.

In a preferred embodiment of the invention, the inner surface 46 is tapered to a degree which is sufficient to achieve a flux density B in the pole which is greater than 50% of the saturation flux density $B_S$ of the pole. More preferably, the pole 18 is configured such that the flux density B in the pole falls between a minimum flux density $B_{min}$ and a maximum flux density $B_{max}$. The minimum flux density $B_{min}$ is sufficiently large to result in an appreciable decrease in the permeability $\mu$ of the pole, and the maximum flux density $B_{max}$ is near but somewhat lower than the saturation flux density $B_S$ of the pole 18. Although the permeability $\mu$ of the pole 18 is a minimum when the pole is fully saturated, that is, when $B=B_S$, operating the electromagnetic actuator 10 at this level would require an inordinately large pole 18 while achieving only a minimal incremental improvement in the permeability of the coil 16. In a preferred embodiment of the invention, the pole 18 is designed to achieve a flux density B in the pole of between approximately 75% and 95% of $B_S$.

In accordance with another aspect of the present invention, the pole 18 comprises an outer surface 48 which may be contoured to follow a non-linear curve as necessary to achieve a linear or prescribed distribution of the magnetic field across the gap 34. For example, the outer surface 48 may be made slightly concave to focus the magnetic field lines back into the coil 16, thereby minimizing the edge effect and leakage problems common to designers of magnetic circuits.

Thus, the present invention yields an electromagnetic actuator 10 that is capable of generating relatively large actuating forces while adhering to the maximum current and inductance levels prescribed by the IS regulations. Therefore, the electromagnetic actuator may be used in IS devices to produce forces which are greater than such devices were heretofore capable of generating.

It should be recognized that, while the present invention has been described in relation to the preferred embodiments thereof, those skilled in the art may develop a wide variation of structural and operational details without departing from the principles of the invention. For example, the various elements illustrated in the different embodiments may be combined in a manner not illustrated above. Therefore, the appended claims are to be construed to cover all equivalents falling within the true scope and spirit of the invention.

What is claimed is:

1. An electromagnetic actuator for a device having a first component which is movable relative to a second component, the electromagnetic actuator comprising:
   a coil which is coupled to the first component;
   a magnetically permeable core which is coupled to the second component and which comprises an annular pole having first and second ends, a cylindrical keeper positioned around the pole, and a base connecting the first end of the pole to an adjacent end of the keeper;
   wherein the inner diameter of the keeper is greater than the outer diameter of the pole and the coil is positioned between the keeper and the pole;
   a magnet which is magnetically coupled to the core and which produces a magnetic field having flux lines that flow through the keeper, the base and the pole and across the coil;
   wherein the pole comprises an inner annular surface which is tapered from the first end to the second end; and
   wherein the inner surface of the pole is tapered such that the flux density of the magnetic field in the pole is greater than 50% of the saturation flux density of the pole.

2. The electromagnetic actuator of claim 1, wherein the inner surface of the pole is tapered such that the flux density of the magnetic field in the pole is between about 75% to 95% of the saturation flux density of the pole.

3. An electromagnetic actuator for a device having a first component which is movable relative to a second component, the electromagnetic actuator comprising:
   a coil which is coupled to the first component;
   a magnetically permeable core which is coupled to the second component and which comprises an annular pole having first and second ends, a cylindrical keeper positioned around the pole, and a base connecting the first end of the pole to an adjacent end of the keeper;
   wherein the inner diameter of the keeper is greater than the outer diameter of the pole and the coil is positioned between the keeper and the pole;
   a magnet which is magnetically coupled to the core and which produces a magnetic field having flux lines that flow through the keeper, the base and the pole and across the coil;

wherein the pole comprises an inner annular surface which is tapered from the first end to the second end; and wherein the inner surface of the pole comprises a non-linear tapered surface.

4. The electromagnetic actuator of claim 3, wherein the inner surface of the pole is a non-linear tapered surface of the third order.

5. The electromagnetic actuator of claim 3, wherein the inner surface of the pole is tapered such that the flux density of the magnetic field in the pole is approximately the same from the first end to the second end.

6. The electromagnetic actuator of claim 5, wherein the inner surface of the pole is tapered such that the flux density of the magnetic field in the pole is greater than 50% of the saturation flux density of the pole.

7. The electromagnetic actuator of claim 6, wherein the inner surface of the pole is tapered such that the flux density of the magnetic field in the pole is between about 75% to 95% of the saturation flux density of the pole.

8. The electromagnetic actuator of claim 1, wherein the inner surface of the pole is tapered such that the flux density of the magnetic field in the pole is approximately the same from the first end to the second end.

9. An electromagnetic actuator for a device having a first component which is movable relative to a second component, the electromagnetic actuator comprising:

a coil which is coupled to the first component;

a magnetically permeable core which is coupled to the second component and which comprises an annular pole having first and second ends, a cylindrical keeper positioned around the pole, and a base connecting the first end of the pole to an adjacent end of the keeper;

a generally cylindrical magnet which is positioned around the pole and which comprises an outer diameter that is approximately the same as the inner diameter of the keeper and an inner diameter that is greater than the outer diameter of the core to thereby define a gap between the magnet and the pole in which the coil is positioned;

wherein the magnet is attached to the keeper and produces a magnetic field having flux lines that flow through the keeper, the base and the pole and across the gap; and wherein the pole comprises an inner annular surface which is tapered from the first end to the second end.

10. The electromagnetic actuator of claim 9, wherein the inner surface of the pole is tapered such that the flux density of the magnetic field in the pole is greater than 50% of the saturation flux density of the pole.

11. The electromagnetic actuator of claim 10, wherein the inner surface of the pole is tapered such that the flux density of the magnetic field in the pole is between about 75% to 95% of the saturation flux density of the pole.

12. The electromagnetic actuator of claim 9, wherein the inner surface of the pole is a non-linear tapered surface.

13. The electromagnetic actuator of claim 12, wherein the inner surface of the pole is a non-linear tapered surface of the third order.

14. The electromagnetic actuator of claim 12, wherein the inner surface of the pole is tapered such that the flux density of the magnetic field in the pole is approximately the same from the first end to the second end.

15. The electromagnetic actuator of claim 14, wherein the inner surface of the pole is tapered such that the flux density of the magnetic field in the pole is greater than 50% of the saturation flux density of the pole.

16. The electromagnetic actuator of claim 15, wherein the inner surface of the pole is tapered such that the flux density of the magnetic field in the pole is between about 75% to 95% of the saturation flux density of the pole.

17. The electromagnetic actuator of claim 9, wherein the inner surface of the pole is tapered such that the flux density of the magnetic field in the pole is approximately the same from the first end to the second end.

18. The electromagnetic actuator of claim 17, wherein the inner surface of the pole is tapered such that the flux density of the magnetic field in the pole is greater than 50% of a saturation flux density of the pole.

19. The electromagnetic actuator of claim 18, wherein the inner surface of the pole is tapered such that the flux density of the magnetic field in the pole is between about 75% to 95% of the saturation flux density of the pole.

20. A method of making an electromagnetic actuator for a device having a first component which is movable relative to a second component, the method comprising:

providing a coil which is connectable to the first component;

providing a magnetically permeable core which is connectable to the second component and which comprises a pole having an inner surface and first and second ends, a tubular keeper positioned around the pole, and a base connecting the first end of the pole to an adjacent end of the keeper;

positioning the coil at least partially between the pole and the keeper;

coupling a magnet to the core such that the flux lines of the magnetic field produced by the magnet will flow through the keeper, the base and the pole and across the coil; and tapering the inner surface of the pole from the first end to the second end;

wherein the tapering step comprises tapering the inner surface of the pole such that the flux density of the magnetic field in the pole is greater than 50% of the saturation flux density of the pole.

21. The method of claim 20, wherein the tapering step comprises tapering the inner surface of the pole such that the flux density of the magnetic field in the pole is between about 75% to 95% of the saturation flux density of the pole.

22. A method of making an electromagnetic actuator for a device having a first component which is movable relative to a second component, the method comprising:

providing a coil which is connectable to the first component;

providing a magnetically permeable core which is connectable to the second component and which comprises a pole having an inner surface and first and second ends, a tubular keeper positioned around the pole, and a base connecting the first end of the pole to an adjacent end of the keeper;

positioning the coil at least partially between the pole and the keeper;

coupling a magnet to the core such that the flux lines of the magnetic field produced by the magnet will flow through the keeper, the base and the pole and across the coil; and tapering the inner surface of the pole from the first end to the second end;

wherein the tapering step comprises imparting a non-linear taper to the inner surface of the pole.

23. The method of claim 22, wherein the tapering step comprises imparting a non-linear taper of the third order to the inner surface of the pole.

24. The method of claim 22, wherein the tapering step comprises tapering the inner surface of the pole such that the flux density of the magnetic field in the pole is approximately the same from the first end to the second end.

25. The method of claim 24, wherein the tapering step comprises tapering the inner surface of the pole such that the flux density of the magnetic field in the pole is greater than 50% of the saturation flux density of the pole.

26. The method of claim 25, wherein the tapering step comprises tapering the inner surface of the pore such that the flux density of the magnetic field in the pole is between about 75% to 95% of the saturation flux density of the pole.

27. The method of claim 20, wherein the tapering step comprises tapering the inner surface of the pole such that the flux density of the magnetic field in the pole is approximately the same from the first end to the second end.

\* \* \* \* \*